US007231322B2

(12) United States Patent
Kenworthy

(10) Patent No.: US 7,231,322 B2
(45) Date of Patent: Jun. 12, 2007

(54) HARDWARE/SOFTWARE CAPABILITY RATING SYSTEM

(75) Inventor: Mark Lee Kenworthy, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 10/609,187

(22) Filed: Jun. 26, 2003

(65) Prior Publication Data

US 2004/0268341 A1 Dec. 30, 2004

(51) Int. Cl.
*G21C 17/00* (2006.01)
(52) U.S. Cl. .......................... 702/186; 714/37; 714/47
(58) Field of Classification Search ................. 702/186
See application file for complete search history.

(56) References Cited

U.S. PATENT DOCUMENTS 6,487,522 B1 * 11/2002 Smith et al. ................. 702/186

FOREIGN PATENT DOCUMENTS

| EP | 1096406 | 5/2001 |
| GB | 2355821 | 5/2001 |

OTHER PUBLICATIONS

Futuremark Corp., "Futuremark Corporation Releases 3DMark™ 99 Max," 2 pp. (Document dated Mar. 8, 1999) [Downloaded from the World Wide Web on Sep. 14, 2005].
Futuremark Corp., "EA's Westwood Studios Teams with NVIDIA and MadOnion.com™," 2 pp. (Document dated Jan. 7, 2001) [Downloaded from the World Wide Web on Sep. 14, 2005].
Futuremark Corp., "MadOnion.com™ Releases 3DMark® 2001," 3 pp. (Document dated Mar. 13, 2001) [Downloaded from the World Wide Web on Sep. 14, 2005].
Futuremark Corp., "BAPCo® Debuts SYSmark® 2001," 3 pp. (Document dated Apr. 18, 2001) [Downloaded from the World Wide Web on Sep. 14, 2005].
Futuremark Corp., "MadOnion.com™'s Performance Analyzer Revolutionizes Online Shopping for PCs and Components," 2 pp. (Document dated Aug. 14, 2001) [Downloaded from the World Wide Web on Sep. 14, 2005].
Futuremark Corp., "MadOnion.com™ Powers NVIDIA's and VisionTek's Web Sites," 2 pp. (Document dated Oct. 16, 2001) [Downloaded from the World Wide Web on Sep. 14, 2005].

(Continued)

*Primary Examiner*—John Barlow
*Assistant Examiner*—Stephen J. Cherry
(74) *Attorney, Agent, or Firm*—Klarquist Sparkman, LLP

(57) ABSTRACT

Techniques and tools for rating computer products are described. For example, software ratings are based on subjective evaluations to determine computer system requirements for a positive user experience, while a computer running a capability tool rates a computer system's (or hardware component's) ability to run software. A capability rating for hardware is determined by comparing a set of features and performance results with capability rating requirements. In another aspect, a capability rating is communicated using a standardized presentation. In another aspect, capability rating level requirements are proposed (e.g., by a ratings board) and then finalized. A capability rating level is determined for computer products (e.g., by a testing organization) based on the finalized requirements and analysis of the products (e.g., by a computer running a capability tool). In another aspect, a software system includes an inventory module, a performance testing module, and an inventory and performance evaluator module.

30 Claims, 6 Drawing Sheets

OTHER PUBLICATIONS

Futuremark Corp., "MadOnion.com™ Releases 3DMark® 2001 Second Edition," 2 pp. (Document dated Feb. 12, 2002) [Downloaded from the World Wide Web on Sep. 14, 2005].

Futuremark Corp., "MadOnion.com™'s PCMark™ 2002 to Revolutionize Benchmarking of PCs with a Single, Cross-Platform Tool," 2 pp. (Document dated Mar. 12, 2002) [Downloaded from the World Wide Web on Sep. 14, 2005].

Futuremark Corp., "3DMark® 03 Released," 2 pp. (Document dated Feb. 11, 2003) [Downloaded from the World Wide Web on Sep. 14, 2005].

Futuremark Corp., "Futuremark® Service Deployed for Windows XP Game Advisor," 2 pp. (Document dated Dec. 2, 2003) [Downloaded from the World Wide Web on Sep. 14, 2005].

Futuremark Corp., "Microsoft Windows Game Advisor 3.0 Launches," 2 pp. (Document dated Jun. 21, 2005) [Downloaded from the World Wide Web on Sep. 14, 2005].

Futuremark Corp., "Online Services: Performance Analyzer—FAQ," 2 pp. (Document undated) [Downloaded from the World Wide Web on Sep. 14, 2005].

Futuremark Corp., "Online Services: Performance Analyzer—Performance Analyzer Service Description," 2 pp. (Document undated) [Downloaded from the World Wide Web on Sep. 14, 2005].

Futuremark Corp., "Online Services: Performance Analyzer," 2 pp. (Document undated) [Downloaded from the World Wide Web on Sep. 14, 2005].

Microsoft Corp., "Windows Game Advisor," 3 pp. (Document dated Jun. 28, 2005) [Downloaded from the World Wide Web on Sep. 14, 2005].

Smith, Nick, "3DMark2001," 2 pp. (Document undated) [Downloaded from the World Wide Web on Sep. 14, 2005].

Microsoft Corporation, "Multimedia PC Level 1 and Level 2 Specifications," Microsoft Knowledge Base Article 106055, 5 pp. (document dated Oct. 1999) [downloaded from the World Wide Web on May 25, 2003].

MacSpeedZone, "MacBench 4.0 Documentation," 25 pp. (document dated 1999-2003) [downloaded from the World Wide Web on May 29, 2003].

Microsoft Corporation, "Software 'Designed for Windows XP,'" 1 p. (document dated Apr. 2002) [downloaded from the World Wide Web on May 26, 2003].

Microsoft Corporation, "Software Technical Requirements," 1 p. (document dated Apr. 2002) [downloaded from the World Wide Web on May 26, 2003].

Microsoft Corporation, "Windows Logo Program: 'Designed for WindowsXP' Application Specification, Version 2.3," pp. 1-10 (Jan. 2002).

Monroe, "How to Buy Software for Windows 95/98," 3 pp. (document dated 1998-1999).

International Organization for Standardization, "Stages of the Development of International Standards," 3 pp. (document dated Feb. 13, 2003) [downloaded from the World Wide Web on May 25, 2003].

International Organization for Standardization, "How Are ISO Standards Developed?" 2 pp. (document dated Jul. 17, 2002) [downloaded from the World Wide Web on May 25, 2003].

Mäkinen et al., "A Detailed Process Assessment for Software SMEs," *EuroSPI 2000*, 11 pp. (document dated 2000) [downloaded from the World Wide Web on May 25, 2003].

PC Certify, Inc., "InfoSpotter SnapShot (System Discovery Engine)," 5 pp. (document dated 1999-2003) [downloaded from the World Wide Web on May 23, 2003].

Senftleben, "The Notebook/2 Site," 2 pp. (document dated 1998) [downloaded from the World Wide Web on May 23, 2003].

Senftleben, "The Notebook/2 Site: How to Use This Site to Make a Buying Decision," 2 pp. (document dated 1998) [downloaded from the World Wide Web on May 23, 2003].

PC Certify Inc., "PC Certify Testing Log," www.pccertify.com/downloads/pdf/samlpe_Burn-in-log.pdf, 11 pp. (document dated Dec. 2000) [downloaded from the World Wide Web on May 23, 2003], [downloaded from the World Wide Web on May 23, 2003].

Zwlwietro, "Technology: MPC Standards," 3 pp. (document dated Jul. 1996) [downloaded from the World Wide Web on May 25, 2003].

Becker, "Will that game work on your PC?" CNET News.com, 2 pp. (document dated Jan. 2005) [downloaded from the World Wide Web on Jun. 24, 2005].

SiSoftware, Ltd., "SiSoftware Sandra Legacy Re-Released," 2 pp. (document dated Nov. 2004) [downloaded from the World Wide Web on Jun. 24, 2005].

* cited by examiner

SOFTWARE 180 IMPLEMENTING
CAPABILITY RATING SYSTEM TOOLS

HARDWARE/SOFTWARE CAPABILITY RATING SYSTEM

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to techniques and tools for rating computer product capabilities or requirements and for matching computer software requirements with computer hardware capabilities.

BACKGROUND

Matching system requirements of software with the specifications of the computer system on which it will be used is essential to ensure proper functioning of the software on the system. This is especially true for applications that place significant demands on the computer system, such as computer games and computer-assisted drafting tools. Purchasing software for use on a computer system currently requires an understanding of the system requirements of the software and technical details of the computer system. Unfortunately, the average consumer is often unable to match software requirements to system specifications due to the level of technical knowledge required.

A significant portion of software places great demands on the computing resources of even the newest computer systems. Furthermore, users of resource-intensive applications upgrade their PCs more frequently than those who do not. Therefore, the ability of consumers to match software requirements with system specifications is important to PC manufacturers, component manufacturers, software manufacturers, and hardware and software retailers.

The entertainment software market provides an example of the effects of software requirements/system specifications matching problems facing PC hardware and software manufacturers today. Games created for console platforms (e.g., Sony Playstation® 2, Nintendo® GameCube, or Microsoft® Xbox) tend to have more consistent sales volumes than games created for general-purpose personal computers in part because, with a better guarantee of matching software requirements with system specifications, customers are more willing to buy console titles. Keeping the PC ecosystem vibrant for both games and other performance demanding applications requires a system that enables consumers to purchase such applications with the same surety provided by the game console platforms.

Previous attempts to categorize computer systems were based only on a list of required components for a system. In the 1990s, the Multimedia PC Marketing Council introduced the Multimedia PC (MPC) specifications to provide PC specification guidelines for consumers wishing to run multimedia applications. For example, to achieve the Level 1 MPC specification, a computer system was required to have a processor, RAM, hard disk drive, CD-ROM drive, sound card, and video display with certain characteristics.

Previous attempts to categorize software include Microsoft's "Designed for Windows 95" logo program. Software vendors were granted permission to use Microsoft's "Designed for Windows 95" logo if the vendors met certain software design requirements set by Microsoft. The design requirements ensured that software carrying the logo would work effectively and reliably in a Microsoft Windows 95 operating system environment.

Whatever the benefits of previous techniques, however, they do not have the advantages of the techniques and tools presented below.

SUMMARY

In summary, the described techniques and tools facilitate assigning ratings to computer products based on the capabilities of computer hardware and the requirements of computer software.

In one aspect, a computer system's ability to run software applications (or a computer hardware component's ability to function in a computer system running software applications) is rated. The rating facilitates matching of software application requirements with computer system capabilities. An inventory of the computer system (or computer hardware component) is performed, yielding a set of features. The inventory can include an inventory of system components and features of the components. Performance is tested, yielding performance results for the set of features. The set of features and the performance results are compared with a required set of features and required performance criteria, and a capability rating (e.g., an integer number) is determined based on the comparison. The capability rating can be based on a lowest rating among components of a system or features of a component. The capability rating can be further based on a category of software applications (e.g., entertainment, computer-assisted drafting software, operating system software, image processing software, etc.). The capability rating can be associated with a vendor identifier for the computer system. The rating process can be performed in an operating system environment of the computer system as a feature of the operating system environment.

For example, a computer running a capability tool rates a computer system's ability to run software applications. The capability tool can be a software program downloaded for execution locally or run from a remote computer via a web interface. Capability rating requirements can be obtained locally from the computer system or over a network from a database. Capability rating requirements can be obtained from a device driver signature for a computer hardware component.

In another aspect, communicating a capability rating for a computer product (e.g., a hardware product or software product) involves assigning a capability rating to the computer product. The assigning involves associating a standard presentation of the capability rating with the computer product. The capability rating is determined by a computer-executed capability tool. The associating can be performed under a licensing agreement.

While systems and hardware components are rated based on an objective set of tests, software ratings are based on largely subjective evaluations performed by the software vendor, determining what capability level is required from a computer system to provide a positive user experience with the software product. In some aspects, the software vendor may choose to provide several capability requirement levels, comprising a minimum rating, a recommended rating, and a "works-best" rating. Thus the consumer can determine not only if the software will work adequately on their computer system, but also if it will work exceptionally well.

In another aspect, proposed capability rating level requirements comprising computer system performance criteria are created, and finalized capability rating level requirements are then created (e.g., by a ratings board comprising voting members) based on the proposed capability rating level requirements to establish one or more capability rating levels. A capability rating level is determined (e.g., by a testing organization) for one or more computer hardware devices based on the finalized capability rating level requirements and analysis of the one or more computer hardware devices. The analysis is performed on a computer running a capability tool. In some embodiments, analysis of the proposed capability rating level requirements is received (e.g., from a review group) prior to creating the finalized capability rating level requirements, and the finalized requirements are further based on the analysis of the proposed requirements.

In another aspect, proposed rating levels for software applications are created based on computer system performance requirements for running the software applications on a computer system. Analysis of proposed rating levels is received and finalized rating levels are created based on proposed rating levels and the analysis. A finalized rating level is assigned to software applications based on computer-executed performance testing of the one or more software applications. The finalized rating level matches a capability rating level assigned to the computer system. In some embodiments proposed rating levels are based on performance testing of the one or more software applications.

In another aspect, a software system for rating a computer system's ability to run software applications comprises an inventory module, a performance testing module, and an inventory and performance evaluator module. The inventory and performance evaluator module compares a set of computer system features obtained by the inventory module, performance results obtained by the performance testing module for the set of computer system features, and rating level requirements comprising a required set of features and required performance criteria. The inventory and performance evaluator module determines a rating level for the computer system based on the comparison. The software system can display rating information (e.g., via a graphical user interface) including, for example, rating level requirements, rating levels of individual components in the computer system, recommended computer system upgrade information, and/or a comparison of the performance results and the rating level requirements.

DETAILED DESCRIPTION

Figure 1:
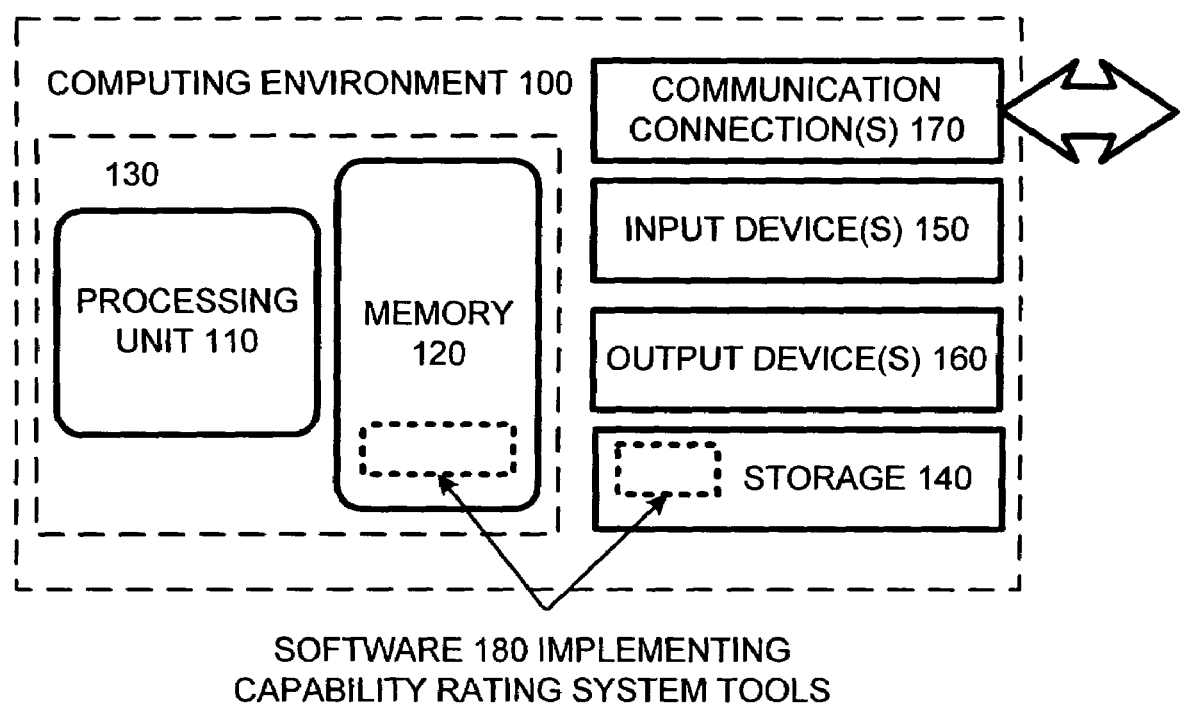
FIG. 1 is a block diagram of an exemplary computing environment for implementing capability rating system tools.

Techniques and tools for implementing a capability rating system are described. The techniques and tools expedite the process of matching software requirements with computer system specifications. The techniques and tools provide a capability rating system that allows prospective purchasers of all knowledge levels to confidently purchase software for a PC, and to understand the value they would receive from purchasing new PC components or a new PC capable of running a broader set of applications.

Consumers, hardware vendors, and software vendors will benefit from techniques and tools that allow a person with a limited understanding of computer system capabilities and software requirements to make informed software and hardware purchases. The described techniques and tools help consumers by, for example, allowing them to purchase demanding multimedia software applications (e.g., games, CAD programs, photo-editing programs, feature-rich operating systems, etc.) without having an unsatisfactory experience due to substandard performance on their PC.

Consumers can use capability ratings on software or hardware to determine if their computer system is becoming substandard for the applications they wish to use. Consumers then can use capability rating information to make an accurate determination of what capability level to seek in a new system purchase or system upgrade. For example, computer games often require a high level of computer capabilities and performance. Computer game players can use capability rating information to determine the best computer system or component for a game they wish to play, or to find a computer game well-suited to the capabilities of their current system.

Different capability rating systems can be used for different kinds of applications. For example, a low rating on a sound card might reduce a capability rating for games, but might not reduce a capability rating for running CAD applications, where sound is less important to application performance.

The described techniques and tools help OEMs by, for example, instilling in consumers increased confidence in the quality of purchased PCs, and increasing motivation to purchase new PCs through consumer desires for key entertainment and other applications. Consumers may purchase higher-end PCs (which typically have higher profit margins than lower-end systems) because of a desire for and increased ability to recognize the value of more highly capable systems. Further, since the capability rating system clarifies software compatibility, the burden placed on customer support resources by frustrated customers is reduced.

Similarly, the described techniques and tools help IHVs by, for example, encouraging consumers to purchase more high-end components as part of new higher-end PC sales or through PC component upgrades. Furthermore, the described techniques and tools help software manufacturers through, for example, increased consumer purchasing confidence, increased sales of software that typically comes bundled with new PC purchases (e.g., operating systems, personal productivity software, and utilities), and, similar to OEMs, a reduction of the burden on customer support resources.

Accordingly, the described techniques and tools allow hardware and software vendors to communicate, in a simple and easily understood manner, capability ratings for computer hardware and software. The described techniques and tools, individually or in combination, include (but are not limited to) the following features:

1. Capability tools (e.g., for OEMs or end users)
2. Metrics board for proposing and deciding rating level requirements
3. Metrics review group for reviewing proposed rating level requirements
4. Standardized rating presentation for hardware (systems and components)
5. Standardized rating presentation for software Capability tools facilitate assigning capability ratings to computer products. For example, in some embodiments, a computer user can use a capability tool to determine a capability rating level for a computer system. In other embodiments, a computer hardware vendor, such as a PC manufacturer or PC component manufacturer, can use a capability tool to determine capability rating levels for its products. There are several differences between capability tools and benchmarking applications; these differences are made apparent from the descriptions and examples herein.

In some embodiments, criteria for assigning capability ratings are determined by a board comprising voting members. The board proposes capability rating level requirements and receives feedback on the proposed requirements from a review group. After receiving feedback, the board decides on capability rating level requirements, which can then be used to assign capability ratings of various levels to computer hardware or software.

In some embodiments, a standardized rating presentation is used to associate computer hardware or software with capability ratings. For example, a rating presentation indicating the capability rating (e.g., an integer number) for a product is used by hardware manufacturers under a licensing agreement. Standard presentations can include several rating levels. For example, the software presentation can include a minimum rating level, a recommended rating level, and/or a "best experience" rating level.

Some embodiments of the described techniques and tools operate in an operating system environment. For example, an operating system environment running on a PC includes a capability tool which facilitates determining a capability rating for the PC.

I. Computing Environment

FIG. 1 illustrates a generalized example of a suitable computing environment 100 in which some of the described techniques and tools may be implemented. FIG. 1 also illustrates a generalized example of a personal computer system configuration and hardware components that can be evaluated using a capability rating system. The computing environment 100 is not intended to suggest any limitation as to scope of use or functionality of described embodiments, which may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing capability rating system tools.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. In some embodiments, operating system software includes capability rating system tools.

The storage 140 may be removable or non-removable, and includes magnetic disks, magnetic tapes or cassettes, CD-ROMs, CD-RWs, DVDs, or any other medium which can be used to store information and which can be accessed within the computing environment 100. In some embodiments, the storage 140 stores instructions for the software 180 implementing capability rating system tools.

The input device(s) 150 may be a touch input device such as a keyboard, mouse, pen, trackball, or game controller, a voice input device, a scanning device, a digital camera, or another device that provides input to the computing environment 100. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, within the computing environment 100, computer-readable media include memory 120, storage 140, communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Capability Ratinq System

As explained above, the described techniques and tools allow computer hardware and software manufacturers to communicate the value of their products to consumers and stimulate more frequent computer hardware and software purchases. The described techniques and tools, individually or in combination, include (but are not limited to) the following features:

1. Capability tools (e.g., for OEMs or end users)
2. Metrics board for proposing and deciding rating level requirements 3. Metrics review group for reviewing proposed rating level requirements 4. Standardized rating presentation for hardware (systems and components)

5. Standardized rating presentation for software

A. Capability Rating Levels

A capability rating level represents the capability of the rated item to perform functions for which the rated item is designed. For example, the capability rating of a computer system represents the capability of the computer system to run software applications.

The capability rating of a computer system is typically a function of the capability ratings of its components. However, it may not be necessary to increase ratings for all components of a system in order to increase the rating for the system as a whole. In some embodiments, a capability rating level is determined (e.g., by a capability tool) using a "weakest link" analysis—the capability rating level for a system is determined by identifying the component within the system having the lowest capability. For example, the capability rating level for a computer system is determined to be "3" by finding that the component within the primary device set of system with the lowest capability has a capability rating level of "3." The "weakest link" analysis also can be applied to determining capability ratings for PC components, by determining the feature of the component with the lowest capability.

Figure 2:
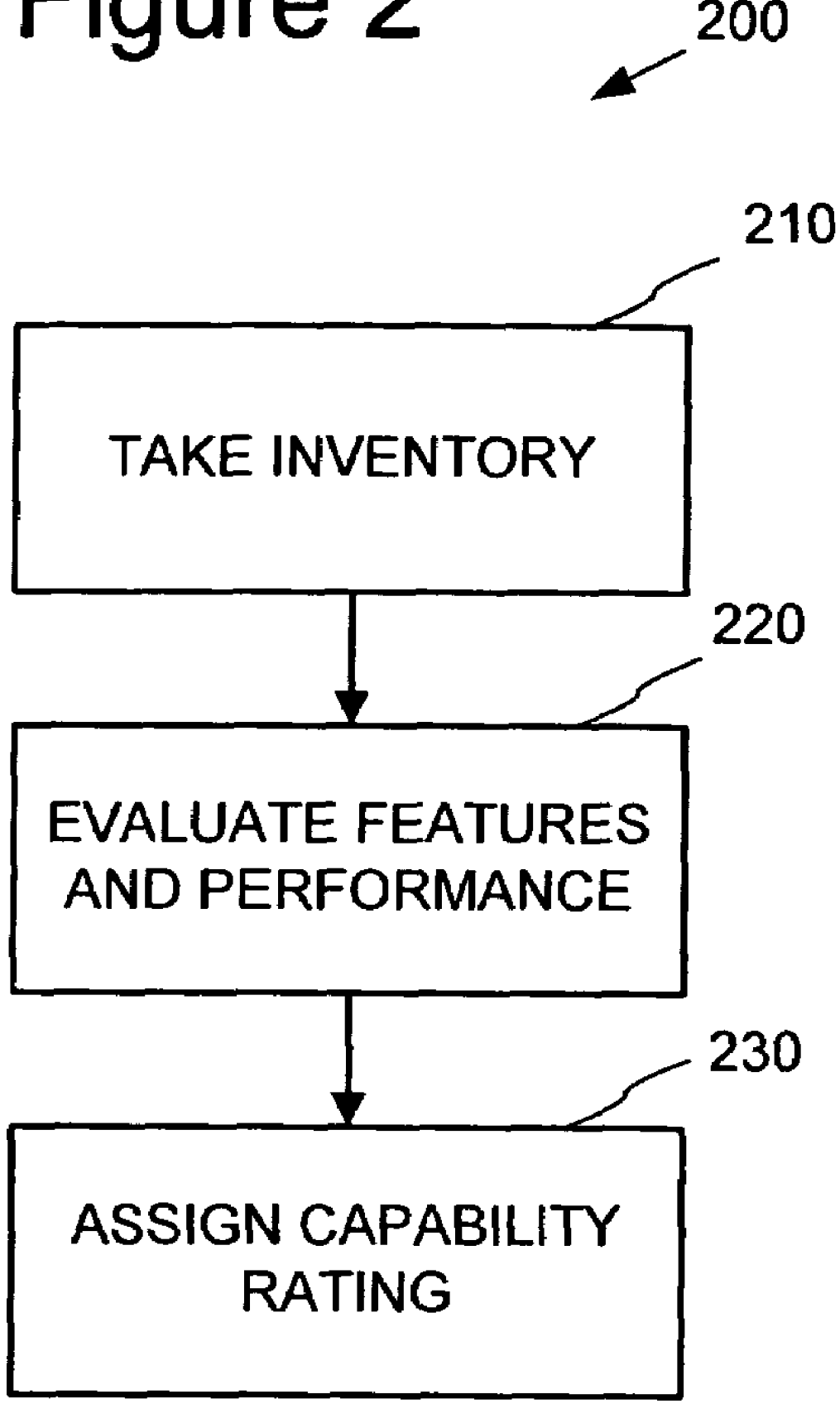
FIG. 2 is a flow chart showing a technique for assigning a capability rating to a computer hardware device.

FIG. 2 shows a technique 200 for determining a capability rating for a computer system or component. At 210, an inventory is taken of the computer system or component. For example, when determining a capability rating for a computer system, a capability tool takes an inventory of components in a computer system that are relevant to the capability of the system to run software applications and, in addition, takes an inventory of features of components within the computer system.

At 220, the features and the performance of the computer system or component are evaluated to determine a rating. A capability rating is determined based on a required set of features with a required level of performance. For example, a capability rating for a graphics component may require the component to have a graphics chip capable of transforming 1,000,000 generic polygons per second and require a certain level of overall graphics performance for the component. A graphics component may not qualify for the capability rating if it has a graphics chip capable of transforming the required number of generic polygons per second but is not able to transform that many polygons with a specific set of features turned on.

Finally, at 230, a capability rating is assigned to the system or individual component based on the inventory and the evaluating of the features and performance.

B. Capability Tools

Capability tools are tools for assigning capability rating levels to computer products. For example, in some embodiments, a computer user can run a capability tool on a PC to determine a capability rating level for the system. In other embodiments, an OEM, IHV or testing lab can use a capability tool to determine capability rating levels. Capability tools for OEMs, IHVs and testing labs include a more extensive set of testing tools, while capability tools for most consumers include fewer testing tools and run more quickly than capability tools for OEMs, IHVs and testing labs. However, capability tools for consumers wishing to perform more robust testing of computer systems can include a full set of testing tools.

Capability tools analyze computer hardware and use results of the analysis in combination with capability rating level data to determine a capability rating level (e.g., an integer number) for the hardware. Capability rating level data can be accessed from a database (e.g., an online database). Or, capability rating level data can be provided with a computer system or component (e.g., embedded in a device driver signature). A capability tool can be accessed or downloaded over a network, accessed locally (e.g., as a feature of an operating system on a computer system to be rated), or provided to a user of the tool by other means (e.g., by distribution on a CD-ROM or other computer-readable medium).

Figure 3:
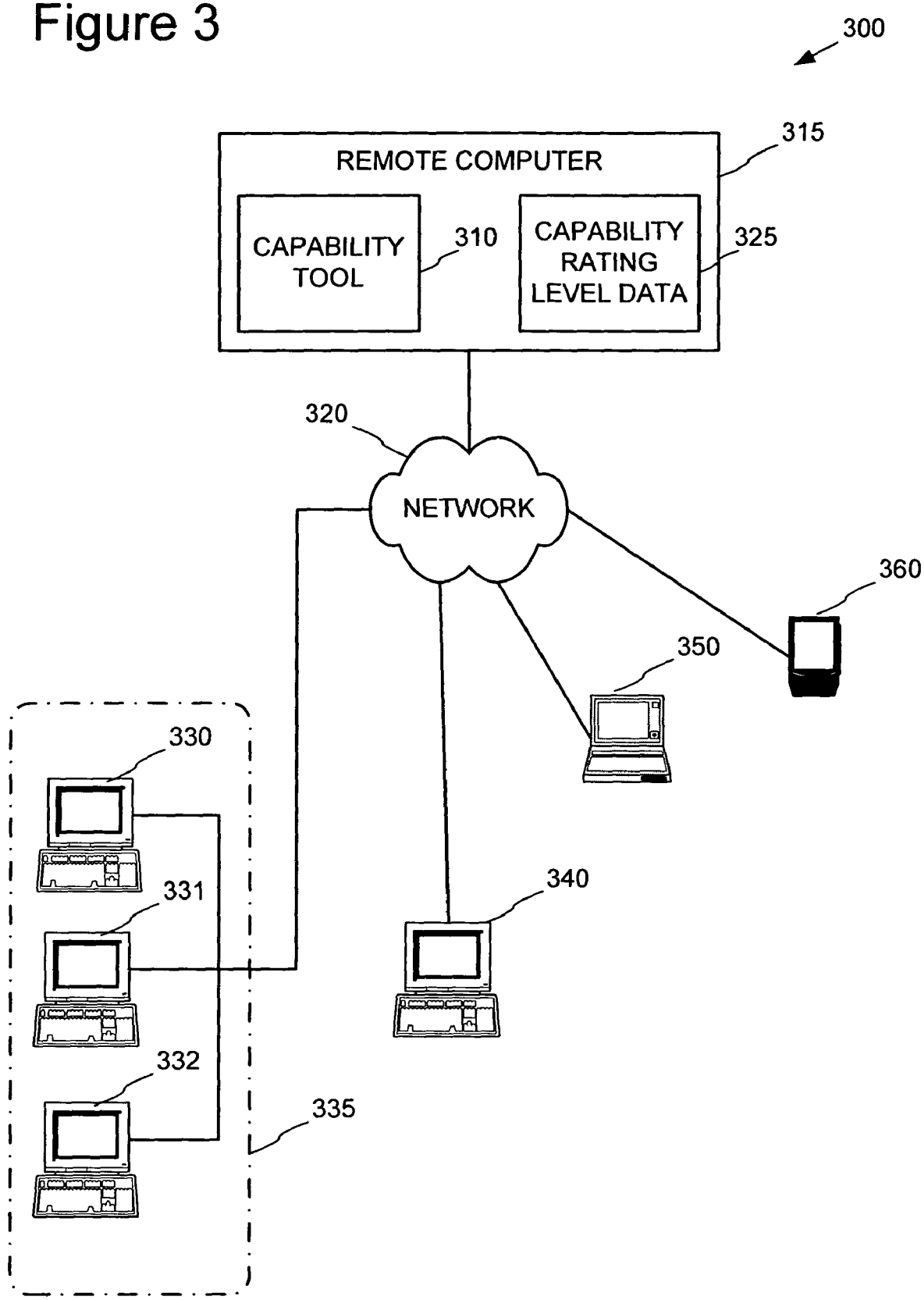
FIG. 3 is an illustration of an exemplary arrangement by which computer users can access a capability tool via a network.

FIG. 3 shows an exemplary arrangement 300 in which one or more computer users can access a capability tool 310 at a remote computer 315 via a network 320. In addition to the capability tool 310, the remote computer 315 also may have capability rating level data 325 (e.g., in a database), which the capability tool can use to determine capability ratings for a computer product. Alternatively, capability rating level data is at another location (e.g., within the capability tool itself, or in a device driver signature of a hardware component). A computer user can use capability tool 310 by connecting to remote computer 315 and running the tool from the remote computer (e.g., via a web interface). Or, a computer user can download capability tool 310 and run the tool locally. In some embodiments, a capability tool is available at a website of a computer hardware or software manufacturer for use by users or retailers of the manufacturers' products. In particular, an online capability tool can be useful for retailers providing PC upgrade services. In other embodiments, a capability tool is available on another website for use by a manufacturer.

A computer user can access the capability tool 310 from a variety of computing devices connected to network 320 via a wired connection (e.g., via an analog telephone line connection, DSL connection, cable modem connection, or some other wired connection) or a wireless connection, and/or via some other network. For example, a computer user can access capability tool 310 via a desktop computer connected to a local network, such as desktop computers 330-332 connected to local network 335. Or, a computer user can access capability tool 310 via a desktop computer that is not connected to a local network, such as desktop computer 340. A computer user can also access capability tool 310 from computing devices such as portable laptop computer 350, hand-held computer 360, or some other computing device, such as a computing device with cellular telephone functionality or other functionality.

Capability tools can provide information to a user of the tool regarding the system or component being rated. For example, in some embodiments, in addition to providing a capability rating, a capability tool for determining a capability rating for PC can display (e.g., via a graphical user interface) capability level requirements for one or more capability levels, capability ratings for components of the PC, and/or a comparison of the PCs features and performance with those needed to reach one or more capability levels (e.g., showing how PC specifications exceed or fall short of requirements for a given capability level). Capability tools for consumers can differ from capability tools for vendors in terms of the amount and nature of information they display. Capability tools for vendors, for example, may contain additional technical details regarding component and feature inventories and performance results. For example, a capability tool for use by a component manufacturer may include technical performance data and details on how to improve a component's capability rating.

In some embodiments, a capability tool provides upgrade information to a user of the tool. For example, a capability tool that has determined the capability rating of a computer system to be "3" can provide information on how a user of the computer system could upgrade the system to reach a capability rating of "4" (e.g., by upgrading a "weakest link" component with a rating of "3" to a rating of "4").

Capability tools can use tools such as Microsoft's DirectX Diagnostics (DXDiag), DirectX Caps Viewer, or Display Conformance Test (DCT) or benchmarking tools to perform or assist in performing certain functions, such as taking inventory of components or component features, or testing performance of systems or components.

C. Capability Rating Level Requirements: Decision-Making

In some embodiments, criteria for assigning capability ratings are determined by a board comprising voting members. The board proposes capability rating level requirements and receives feedback on the proposed requirements from a review group. After receiving feedback, the board decides on capability rating level requirements, which can then be used to assign capability ratings of various levels to computer hardware or software.

Figure 4:
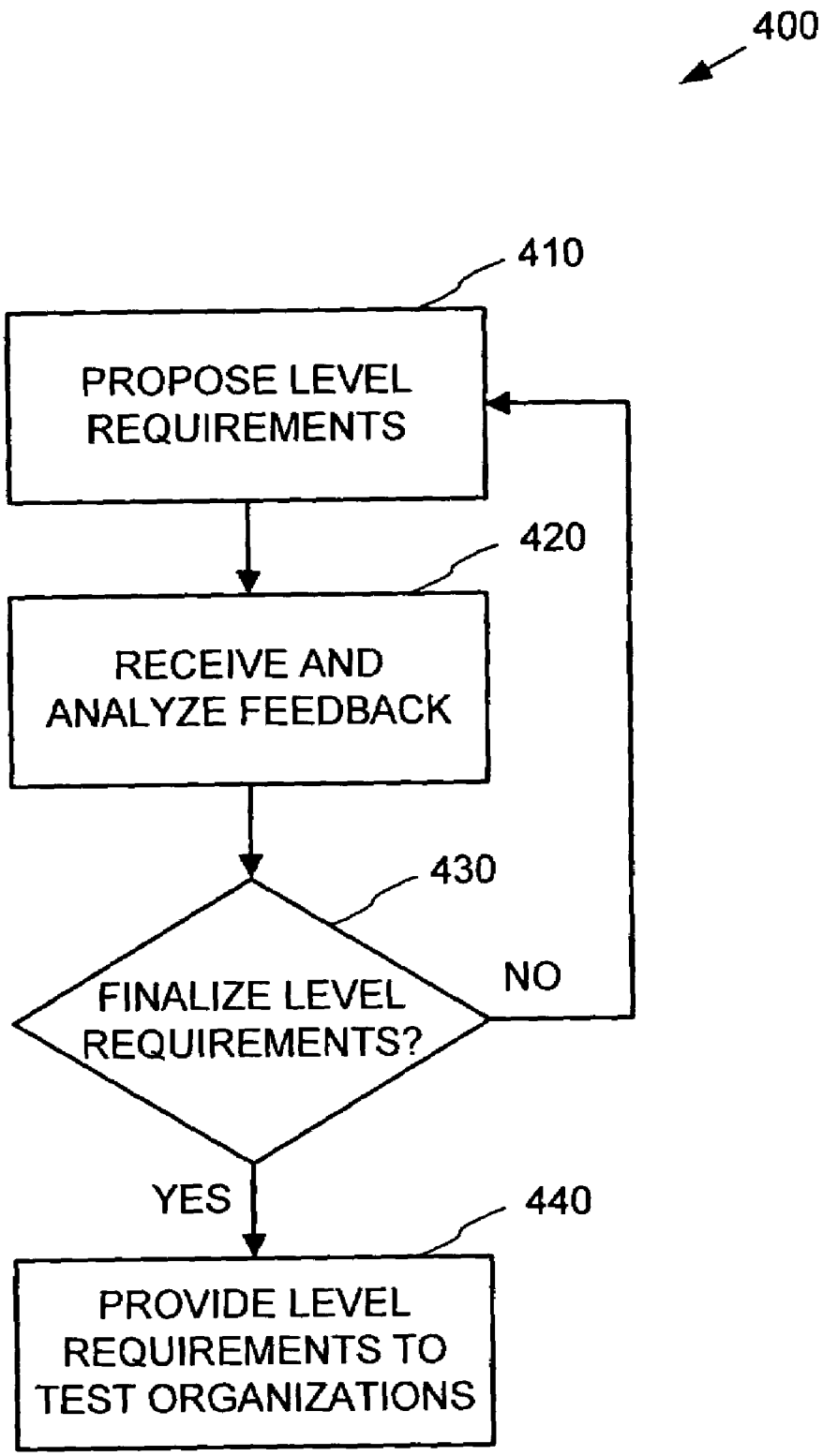
FIG. 4 is a flow chart showing a technique for deciding capability rating level requirements.

FIG. 4 is a flow chart illustrating a technique 400 for deciding capability rating level requirements. At 410, level requirements are proposed by a decision-making entity. At 420, the decision-making entity receives feedback (e.g., comments on the proposed requirements) and analyzes the feedback. At 430, the decision-making entity determines whether to finalize the level requirement (e.g., whether to end the feedback process and issue actual level requirements to be put into effect for a rating system). If the decision-making entity chooses not to finalize the requirements, the entity can propose additional or revised level requirements and receive feedback on those proposed requirements. If the decision-making entity chooses to finalize the requirements, the entity provides (at 440) the level requirements to test organizations, which can assign appropriate capability ratings to the hardware or software based on the level requirements. Alternatively, a decision-making entity can employ different techniques for deciding on rating level requirements. For example, the decision-making entity may not receive feedback on requirements before deciding on actual requirements to be provided to testing organizations. Or, the decision-making entity can employ additional procedures, omit procedures, or perform procedures in a different order.

Figure 5:
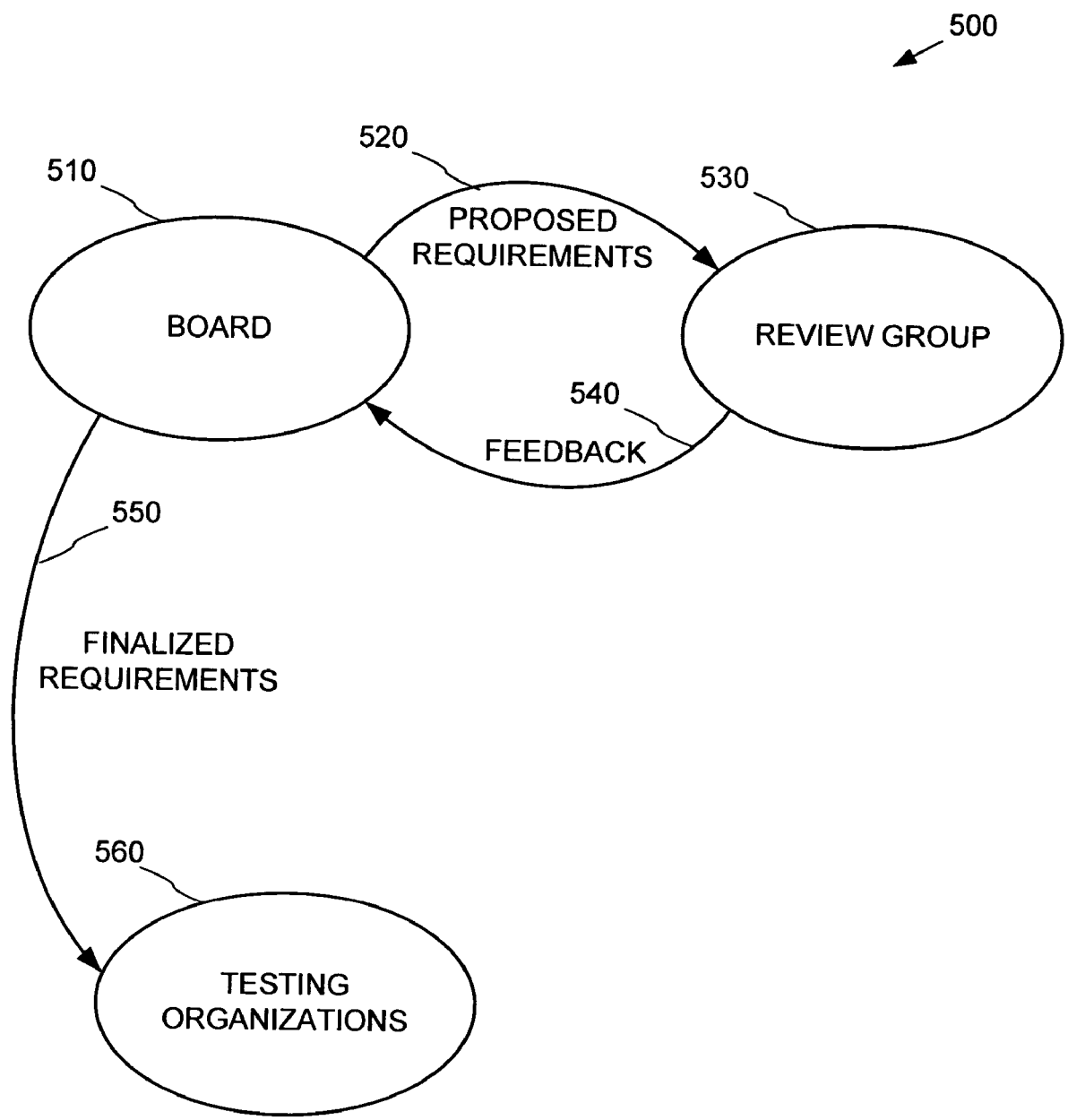
FIG. 5 is an illustration of an exemplary arrangement for deciding capability rating level requirements.

FIG. 5 shows an exemplary arrangement 500 for deciding capability rating level requirements. A board 510 constructs proposed requirements 520 for one or more capability rating levels. The board 510 sends the proposed requirements 520 to a review group 530, which considers the proposed requirements 520 and provides feedback 540 to the board 510 regarding the proposed requirements 520. The board considers the feedback 540 and determines whether to decide on final requirements 550 for the one or more capability rating levels. The board can also revise the proposed requirements 520 and present new proposals to the review group 530 for further consideration. When the board 520 decides on final requirements for the one or more capability rating levels, the board presents the requirements to testing organizations 560. Alternatively, requirements can be decided upon by different entities, by a different arrangement of entities, or using different procedures. For example, the board 510 may not, in some cases, receive or consider feedback from the review group 530, or the board may provide requirements to manufacturers rather than to testing organizations.

Figure 6:
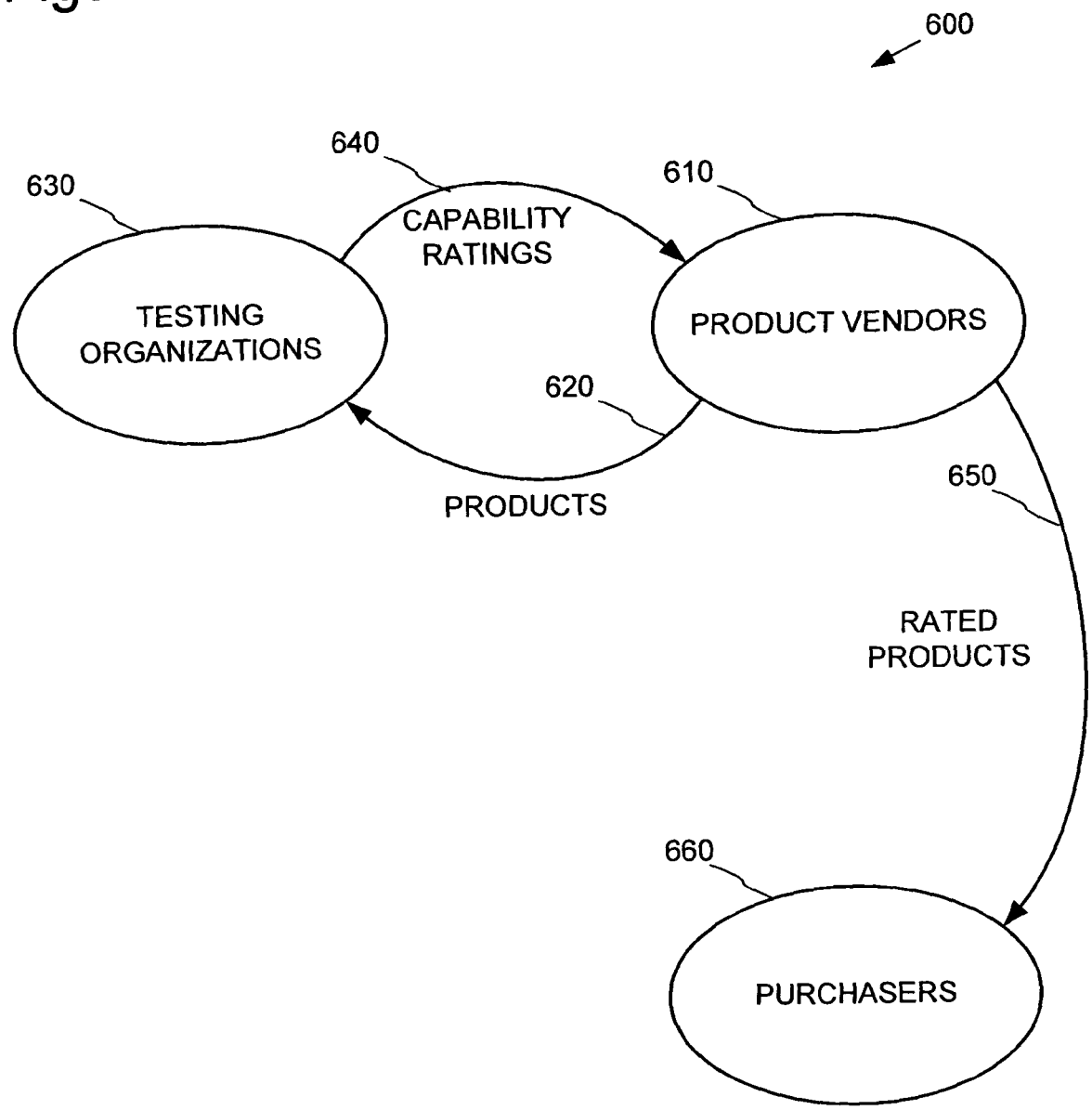
FIG. 6 is an illustration of an exemplary arrangement for rating of computer products by testing organizations.

Testing organizations can use capability rating level requirements to test computer hardware or software and assign appropriate capability ratings to the hardware or software. For example, FIG. 6 shows an exemplary arrangement for rating of computer products by testing organizations. Product vendors 610 provide products 620 to testing organizations 630. The testing organizations test the products and use the capability rating level requirements to provide capability ratings 640 for the products 620. The product vendors 610 can then sell rated products 650 to purchasers 660.

In some embodiments, a board comprises a set of OEM and ISV representatives, who can propose and/or decide on rating level requirements. OEM representatives can include representatives of manufacturers of major PC brands (e.g., Dell, Gateway, Sony, Hewlett-Packard, etc.). ISV representatives can include representatives of software manufacturers involved in producing software that makes significant demands on PC resources (e.g., entertainment software manufacturers such as Electronic Arts, Atari, Microsoft, Activision, etc.). The board also can receive information and comment from IHVs regarding the rating level requirements and relevant capabilities of planned IHV products. In some cases, IHVs can participate in board decisions or act as board members; in other cases, confidentiality or conflict of interest issues may prevent participation on the board by IHV representatives or other representatives.

The board can decide on the requirements of new rating levels at regular intervals (e.g., one new rating level per year). For example, at annual meetings, the board could convene for a week of half-day meetings, with remaining time spent by members conferring with interested parties regarding issues relevant to setting rating level requirements. Following the meetings, the board can approve a draft specification for a rating level, and submit the draft specification to a review group for comment. Received comments can be distributed to board members for consideration and discussion, and can be incorporated into future proposed requirements or a final set of requirements. Final requirements can be issued in a variety of ways (e.g., by publication on a publicly available website, or by providing them directly to manufacturers or testing organizations).

Board decisions can be made by a majority vote of board members. However, the board can make decisions in other ways. For example, a board also can comprise a leadership group of voting members to work with OEM and ISV representatives. The leadership group can facilitate decision-making by, for example, reserving the right to make a final decision on contentious issues on behalf of the board.

The board also can be described as a metrics board, capability ratings board, etc.

As explained above, the review group can examine proposed requirements and provide feedback to the board for consideration. The review process can be iterative, proceeding until closed by the board or until some event occurs (e.g., a time limit is reached). In some embodiments, the review group comprises a broader set of OEM and ISV representatives, as well as IHV representatives. OEM and ISV representatives can include representatives of the companies described above with reference to the board, or can come from other companies. IHV representatives can include representatives from companies such as Intel, AMD, nVidia, ATI, Matrox, S3, Via, Trident, Silicon Integrated Systems (SiS), 3DLabs, Creative Labs, etc. Diverse representation in the review group encourages broad industry participation and ensures the effectiveness and acceptability of the capability rating system and its requirements.

Once the requirements of a rating level are determined, products can be tested by one or more testing organizations, such as Microsoft's Windows Hardware Quality Labs (WHQL), to determine capability levels for the products. Testing organizations can use a capability tool to determine capability ratings. Typically, testing organizations will use a capability tool with a full set of testing tools, rather than a simpler, consumer-oriented capability tool. The capability level for the product and its technical information and descriptions can be added to a database used by other capability tools. For example, technical information for a graphics accelerator card and its associated capability level can be added to a database accessed by capability tools used by end-users to determine capability ratings for their PCs. In some embodiments, the capability level for the product is associated with a vendor ID for the product.

D. Standardized Capability Rating Presentation

To associate hardware with capability ratings that are assigned to them, a standardized rating presentation can be placed on computer hardware. In some embodiments, a rating presentation indicating the capability rating (e.g., an integer number) for a product is used by hardware manufacturers under a licensing agreement (e.g., an agreement with an entity that has set capability rating level requirements and implemented the presentation of rating levels in a standardized format). The licensing agreement can require, for example, that the component or system must have been tested by an approved testing organization to verify the rating level. The standardized rating presentation allows consumers to use capability ratings when determining which computer system or component to purchase, based on their desire to run applications that require or recommend certain capability levels.

Similarly, ISVs can use a standardized rating presentation for software for their products. In some embodiments, the standardized rating presentation for software is virtually identical to the hardware presentation to help consumers recognize and match capability ratings for hardware and software. The standardized rating presentation for software may also be used under a license agreement. Such an agreement may further require, for example, that software products using the rating presentation conform to other standards. For example, the license agreement may require the software to fulfill requirements for running the software on a particular operating system (e.g., Microsoft's Windows XP application logo requirements).

The software presentation can include several rating levels. For example, the software presentation can include a minimum rating level, a recommended rating level, and/or a "best experience" rating level. Having several rating levels in the presentation allows consumers with different expectations of performance to select software that works best for them. Furthermore, having rating levels such as a "best experience" rating level can encourage consumers to purchase system upgrades.

III. Implementation as Operating System Features

Some of the tools and techniques described above can be implemented as operating system features. For example, in some embodiments, an operating system includes a capability tool for determining a capability rating for a PC running the operating system, or for a component of the PC. The capability tool also can update capability ratings for the PC or PC components when the PC is upgraded, or when new capability rating level requirements are determined.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

I claim:

1. A method performed by a computer of rating a computer system's ability to run software applications, wherein the rating facilitates matching of software application requirements with computer system capabilities, the method comprising:
    performing an inventory of the computer system, wherein the performing an inventory yields a set of computer system features;
    testing performance of the computer system, wherein the testing yields performance results for the set of computer system features;
    comparing the set of computer system features and the performance results with capability rating requirements, wherein the capability rating requirements comprise a required set of features and required performance criteria;
    determining a capability rating for the computer system based on the comparing; and
    outputting the capability rating.

2. The method of claim 1 wherein the performing an inventory includes performing an inventory of hardware components in the computer system.

3. The method of claim 2 wherein the performing an inventory further includes performing an inventory of features of the hardware components.

4. The method of claim 1 wherein the computer system comprises components, and wherein the capability rating is based on a lowest component rating among the components.

5. The method of claim 1 wherein the capability rating requirements are established by a board comprising voting members.

6. The method of claim 1 further comprising assigning the capability rating to the computer system.

7. The method of claim 6 further comprising presenting the capability rating in a standardized rating presentation.

8. The method of claim 1 wherein the capability rating is an integer number.

9. The method of claim 1 wherein the acts are performed in an operating system environment of the computer system as a feature of the operating system environment.

10. The method of claim 1 wherein the acts are performed by a capability tool.

11. The method of claim 10 wherein the capability tool is a software program obtained from a remote computer via a network.

12. The method of claim 10 wherein the capability tool is a software program run from a remote computer via a web browser interface.

13. The method of claim 1 wherein the capability rating requirements are obtained over a network from a database.

14. The method of claim 1 wherein the capability rating requirements are obtained from a storage medium in the computer system.

15. The method of claim 1 wherein the capability rating is further based on a category for the software applications, the category selected from a group comprising: entertainment software, computer-assisted drafting software, operating system software, image processing software.

16. The method of claim 1 wherein the capability rating is associated with a vendor identifier for the computer system.

17. A computer-readable medium having stored thereon computer-executable instructions for causing a computer to perform the method of claim 1.

18. A method performed by a computer of rating a computer hardware component, wherein the computer hardware component is operable to perform functions in a computer system, and wherein the functions are useful for running software applications on the computer system, the method comprising:
   performing an inventory of the computer hardware component, wherein the performing an inventory yields a set of computer hardware component features;
   testing performance of the computer hardware component, wherein the testing yields performance results for the set of computer hardware component features;
   comparing the set of computer hardware component features and the performance results with capability rating requirements;
   determining a capability rating for the computer hardware component based on the comparing; and
   outputting the capability rating.

19. The method of claim 18 wherein the capability rating is based on a lowest feature rating among the set of computer hardware component features.

20. The method of claim 18 wherein the capability rating is an integer number.

21. The method of claim 18 wherein the capability rating requirements are established by a rating requirements decision-making organization.

22. The method of claim 18 further comprising assigning the capability rating to the computer hardware component.

23. The method of claim 22 further comprising presenting the capability rating in a standardized rating presentation.

24. The method of claim 18 wherein the acts are performed in an operating system environment of the computer system as a feature of the operating system environment.

25. The method of claim 18 wherein the acts are performed by a capability tool.

26. The method of claim 18 wherein the capability rating requirements are obtained from a device driver signature for the computer hardware component.

27. The method of claim 18 wherein the capability rating is associated with a vendor identifier for the computer hardware component.

28. A computer-readable medium having stored thereon computer-executable instructions for causing a computer to perform the method of claim 18.

29. A software system on one or more computer-readable media, the software system for rating a computer system's ability to run software applications, the software system comprising:
   means for performing an inventory of the computer system, to yield a set of computer system features;
   means for testing performance of the computer system, to yield performance results for the set of computer system features;
   means for comparing the set of computer system features and the performance results with capability rating level requirements; and
   means for determining a capability rating level for the computer system based on the comparing; and
   means for outputting the capability rating level.

30. A software system on one or more computer-readable media, the software system for rating a computer system's ability to run software applications, the software system comprising:
   means for performing an inventory of a computer hardware component, to yield a set of computer hardware component features;
   means for testing performance of the computer hardware component, to yield performance results for the set of computer hardware component features;
   means for comparing the set of computer hardware component features and the performance results with capability rating level requirements; and
   means for determining a capability rating level for the computer hardware component based on the comparing; and
   means for outputting the capability rating level.

* * * * *